R. O. MOBERG.
MEANS FOR SECURING CUTTING SECTIONS OR KNIVES TO SICKLE OR CUTTER BARS.
APPLICATION FILED MAR. 25, 1915.
1,156,703. Patented Oct. 12, 1915.
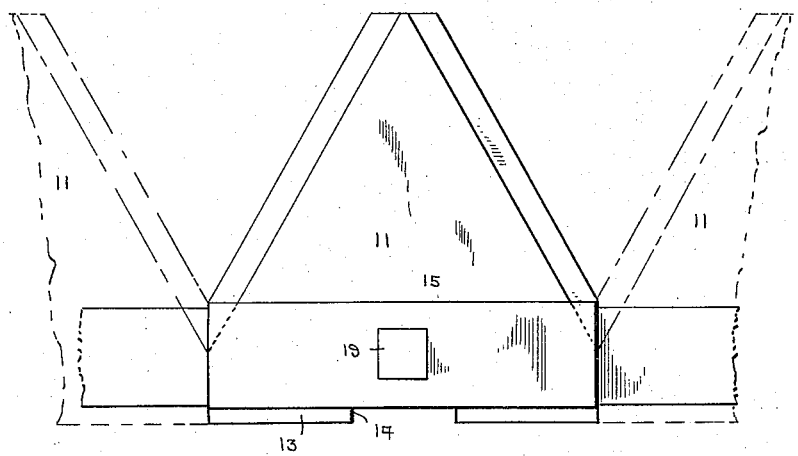
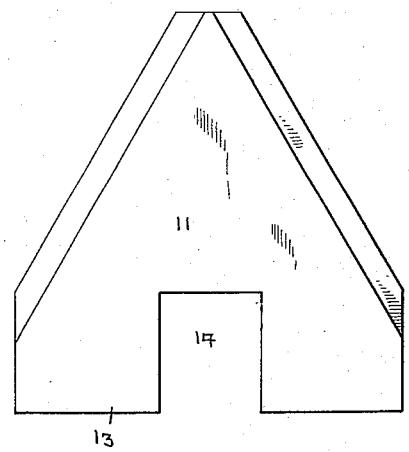
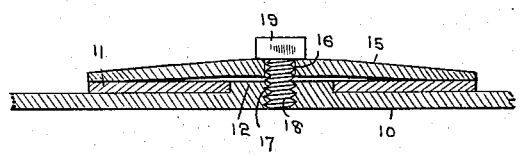
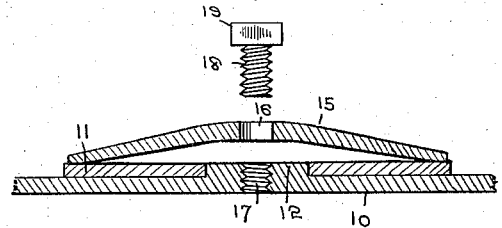
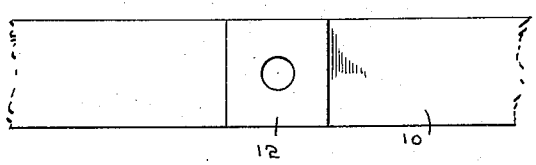
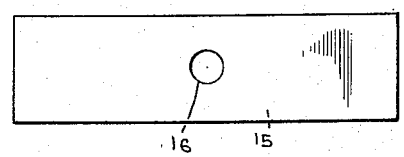
Inventor
R. O. Moberg
Witnesses
By W. J. FitzGerald & Co.
Attorneys

UNITED STATES PATENT OFFICE.

ROBERT O. MOBERG, OF RICHARDSON, WISCONSIN.

MEANS FOR SECURING CUTTING SECTIONS OR KNIVES TO SICKLE OR CUTTER BARS.

1,156,703.  Specification of Letters Patent.  Patented Oct. 12, 1915.

Application filed March 25, 1915. Serial No. 16,933.

*To all whom it may concern:*

Be it known that I, ROBERT O. MOBERG, a citizen of the United States, residing at Richardson, in the county of Polk and State of Wisconsin, have invented certain new and useful Improvements in Means for Securing Cutting Sections or Knives to Sickle or Cutter Bars; and I do hereby declare the following to be a full, clear, and exact description of the invention, such as will enable others skilled in the art to which it appertains to make and use the same.

This invention relates to means for securing cutting sections or knives to sickles or cutter bars and has for its principal object to provide a structure of the character described which will permit the cutters to be readily applied and removed so that broken knives can be taken off the bar and replaced by new ones or detached for the purpose of sharpening and afterward reapplied, the construction being such that all of these tasks may be performed without the use of special tools or need of skilled workmen, whereby a cutter bar or sickle may be immediately repaired by the owner of the machine without removing the machine from the field in which it is operating.

With these objects in view the invention consists in the improved construction, arrangement and combination of the parts of a device of the character mentioned, which will be hereinafter fully described and afterward specifically claimed.

In order that the construction and operation thereof may be readily comprehended, an approved embodiment of the invention is illustrated in the accompanying drawings and will be now specifically described in connection with said drawings, in which—

Figure 1 represents a top plan view of a portion of a cutter bar showing one cutter or knife applied thereto, in full lines and parts of two adjacent cutters in dotted lines. Fig. 2 represents, in plan, a cutter or knife detached from the bar. Fig. 3 represents, in plan, part of the cutter bar proper. Fig. 4 represents, in plan, one of the clips used for securing the knives to the cutter bar. Fig. 5 represents, in vertical section, part of a cutter bar with a knife applied thereto, a clip, and a securing screw in position to be inserted in the bar, and Fig. 6 represents the same parts as Fig. 5 with the securing screw threaded home and the parts in operative position.

Like reference characters indicate the same parts wherever they appear in a plurality of the figures of the drawings.

Referring specifically to the drawings, 10 indicates a cutter or sickle bar which is ordinarily supplied with the usual fingers and upon which are removably secured adjoining knives or cutters 11 of ordinary contour. In order that these knives may be secured, side by side, upon the cutter bar, the latter is provided with rectangular bosses 12, at equal distances apart from center to center, equal to the width of a knife or cutter.

In the base or main body 13 of each knife or cutter is provided a rectangular notch 14 of a depth equal to the width of the cutter bar and a width equal to the width of one of the bosses 12, there being a boss 12 for each knife or cutter 11, a knife being laid upon the cutter bar 10 with one of the bosses 12 projecting into and filling the notch 14 of the knife, as clearly shown in Fig. 5 of the drawings.

At 15 is indicated a clip of which there is one for securing each knife to the cutter bar. This clip is normally slightly bow-shaped longitudinally, as seen in Fig. 5, and is provided with a central perforation 16. After a knife 11 has been placed in position upon a boss 12, as shown in Fig. 5, one of the clips 15 is laid with its ends resting on the knife or cutter and its main body straddling one of the projections 12, with the perforation 16 in vertical alinement with the central threaded opening 17 in the boss 12. A securing screw 18, having an angular head 19 to facilitate its turning, is now dropped through the perforation 16 in the clip 15 into the threaded opening 17 in the boss 12. By turning the screw 18 into the threaded opening 17, the head 14 impinges upon the upper side of the clip 15 and squeezes the clip down to a position substantially parallel to the cutter bar 10, as shown in Fig. 6, in which position said clip yieldingly holds the cutter or knife in position about the projection 12 and in close contact with the cutter bar 10. A tight fit is thus given to all of the parts and on account of the close fit of the knives against each other, the close fit of the notches 14 about the bosses 12, and the yielding pressure of the clips 15 upon the surface of the knife, there is no possibility of rattling or movement between the parts and all wear is avoided. At the same time, however, the mere withdrawal of the screw 19 will permit the removal of the knife or cutter which it holds in position so that the knife may be readily sharpened or repaired if broken.

The simplicity, economy and durability of the construction of my invention will be readily observed from the foregoing description, and while I have specifically described the construction, relation and operation of the parts, it will be obvious to those skilled in the art, that slight changes and variations may be made therein without departing from the spirit and scope of the invention.

Having thus fully described my invention what I claim as new and desire to secure by Letters Patent is:—

1. In a device of the character described, the combination with a cutter bar provided with angular bosses at intervals projecting therefrom and extending from the front to the rear edge thereof, of cutting devices each having a notch extending inwardly from its rear edge of a size and shape to encompass the bosses, upwardly bowed clips, screws adapted to pass through said clips and into the bosses, said screws engaging said clips at their longitudinal centers and adapted to direct downward pressure thereon when the screws are turned into the bosses, whereby said clips will be brought from a bowed position to a substantially flat position, the ends of the clips directing downward pressure on the top of the base edges of the cutting device.

2. A device of the character described, the combination with a cutter bar provided with bosses on one side extending the full width of the bar and provided with centrally threaded openings, of cutting devices provided with central angular notches, of a contour to fit closely upon said bosses, bow-shape resilient clips each provided with a central perforation, each placed with its ends resting upon the outer edges of each cutting device and its center perforation in alinement with the threaded opening of the boss over which the clip is positioned, and an angular headed screw adapted to pass through the perforation of the clip and into the threaded opening of the boss whereby when said screw is threaded into said boss, the clip will be flattened out and its ends brought into strong resilient contact with the cutting device.

In testimony whereof I have signed my name to this specification in the presence of two subscribing witnesses.

ROBERT O. MOBERG.

Witnesses:
 RUDOLPH E. BENSON,
 R. C. MOONEY.

Copies of this patent may be obtained for five cents each, by addressing the "Commissioner of Patents, Washington, D. C."